(12) United States Patent
Driesen et al.

(10) Patent No.: US 12,045,697 B2
(45) Date of Patent: Jul. 23, 2024

(54) DOCUMENT INITIATED INTELLIGENT WORKFLOW

(71) Applicant: SAP SE, Walldorf (DE)

(72) Inventors: Volker Driesen, Heidelberg (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 965 days.

(21) Appl. No.: 17/062,141

(22) Filed: Oct. 2, 2020

(65) Prior Publication Data

US 2022/0108206 A1    Apr. 7, 2022

(51) Int. Cl.
| | | |
|---|---|---|
| *G06N 20/00* | (2019.01) | |
| *G06F 16/907* | (2019.01) | |
| *G06Q 40/08* | (2012.01) | |
| *G06F 18/214* | (2023.01) | |
| *G06F 18/40* | (2023.01) | |
| *G06V 30/40* | (2022.01) | |

(52) U.S. Cl.
CPC ........... *G06N 20/00* (2019.01); *G06F 16/907* (2019.01); *G06Q 40/08* (2013.01); *G06F 18/214* (2023.01); *G06F 18/40* (2023.01); *G06V 30/40* (2022.01)

(58) Field of Classification Search
CPC ....... G06N 20/00; G06F 16/907; G06F 18/40; G06F 18/214; G06Q 40/08; G06V 30/40
See application file for complete search history.

(56) References Cited

U.S. PATENT DOCUMENTS

| | | | |
|---|---|---|---|
| 2007/0198560 A1* | 8/2007 | Foygel | ............... H04N 1/00212 |
| 2012/0066018 A1* | 3/2012 | Piersol | ................... G06Q 10/10 |
| | | | 705/7.14 |
| 2013/0041909 A1* | 2/2013 | Coleman | ............... H04L 63/102 |
| | | | 707/758 |
| 2013/0246345 A1* | 9/2013 | Eisler | ...................... G06F 16/93 |
| | | | 707/608 |
| 2014/0032247 A1* | 1/2014 | Robinson | ............... G06Q 10/10 |
| | | | 705/4 |

* cited by examiner

*Primary Examiner* — Casey R. Garner
(74) *Attorney, Agent, or Firm* — SCHWEGMAN LUNDBERG & WOESSNER, P.A.

(57) ABSTRACT

In an example embodiment, a solution is provided that allows a user to submit a document. Information can be obtained from the document using optical character recognition (OCR) or other techniques. This information can then be used to identify one or more workflows that pertain to the document. The one or more workflows may be ranked using machine learning techniques and presented to the user. Once the user selects a desired workflow, the information obtained from the document can then be used to automatically complete at least a portion of the workflow, for example by prefilling one or more fields in a form.

20 Claims, 7 Drawing Sheets

| | | | |
|---|---|---|---|
| ALL - INSURE COMPANY | | POLICY NUMBER:80-42910 | |
| | | POLICY EFFECTIVE DATE: 5/1/09 | |
| | | YOUR AGENT: A. G. REPRESENT | |
| | AUTO POLICY DECLARATIONS | | |
| SUMMARY | | | |
| NAMED INSURED(S) | YOUR AGENT IS | | |
| JOHN & JANE SMITH | A.G.REPRESENT | | |
| 1234 ALPHABET LANE | (336) 123 - 4567 | | |
| CITYVILLE,NC 00000 - 0000 | | | |
| POLICY NUMBER | POLICY PERIOD | | |
| 80-42910 | MAY 1, 2009 TO NOV AT 12.01 A.M. STANDARD TIME | | |
| DRIVER(S) LISTED | DRIVERS (S) EXCLUDED | | |
| JOHN     JANE S | NONE | | |
| JOE      JOHN D. | | | |
| DESCRIPTION OF VEHICLE (S) | VEHICLE ID NUMBER (VIN)    LIENHOLDER | | |
| 1. 98 CHRYSLER TOWN - COUNTRY | 1G3WH12MT                  NONE | | |
| TOTAL PREMIUM | | | |
| PREMIUM FOR 98 CHRYSLER TOWN - COUNTRY | $104.08 | POLICY EFFECTIVE DATE:5/1/09 | |
| COVERAGE | | | |
| COVERAGE | LIMITS | DEDUCTABLE | PREMIUM |
| AUTOMOBILE LIABILITY INSURANCE | | NOT APPLICABLE | $94.78 |
| BODILY – INJURY | $100,000  EACH PERSON | | |
| | $300,000  EACH OCCURRENCE | | |
| PROPERTY DAMAGE | $100,000  EACH OCCURRENCE | | |
| AUTOMOBILE MEDICAL PAYMENTS | $5,000    EACH PERSON | NOT APPLICABLE | $9.30 |
| TOTAL PREMIUM FOR 98 CHRYSLER TOWN - COUNTRY | | | $104.08 |
| ADDITIONAL COVERAGE | | | |
| COVERAGE | LIMITS | DEDUCTABLE | PREMIUM |
| UNINSURED/UNDERINSURED MOTORISTS | | | $84.50 |
| BODILY – INJURY | $100,000  EACH PERSON | NOT APPLICABLE | |
| | $300,000  EACH OCCURRENCE | | |
| PROPERTY DAMAGE | $100,000  EACH OCCURRENCE | $100 | |
| (UNINSURED MOTORISTS ONLY) | | | |
| AUTOMOBILE MEDICAL PAYMENTS | $5,000    EACH PERSON | N/A | $9.30 |
| AUTOMOBILE DEATH INDEMNITY INSURANCE | | | |
| NAMED INSURED | $10,000 BENEFIT | N/A | N/A |
| SPOUSE OF NAMED INSURED | $10,000 BENEFIT | | |
| AUTOMOBILE DISABILITY INCOME PROTECTION | | | |
| SPOUSE OF NAMED INSURED | $50    WEEKLY INDEMNITY | N/A | $6.00 |
| TOTAL | | | $96.50 |

```
                                        302
                                         ↙                              304A
                                                                         ↙
┌─────────────────────────────────────────────────────────────────────────┐
│                                                                         │
│  ALL - INSURE COMPANY                          POLICY NUMBER: ▯         │
│                                                POLICY EFFECTIVE DATE: ▯ │
│                                      ①        YOUR AGENT: ▯            │
│                    AUTO POLICY DECLARATIONS                       ↖     │
│  SUMMARY                                                         304B   │
│  ─────────────────────────────────────────────────────────────  304C    │
│  NAMED INSURED(S)              YOUR AGENT IS                            │
│                                A.G.REPRESENT                            │
│  ┌──────────┐                  (336) 123 - 4567                         │
│  └──────────┘ ↖ 304D                                                    │
│                                                                         │
│  POLICY NUMBER                 POLICY PERIOD                            │
│  ┌────┐                        ┌──────────────────────────────┐         │
│  └────┘                        └──────────────────────────────┘         │
│  DRIVER(S) LISTED              DRIVERS (S) EXCLUDED                     │
│  ┌──────┐                      ┌────┐                                   │
│  └──────┘                      └────┘                                   │
│  DESCRIPTION OF VEHICLE (S)    VEHICLE ID NUMBER (VIN)  LIENHOLDER      │
│  ┌──────────────────┐          ┌──────┐                 ┌──────┐        │
│  └──────────────────┘          └──────┘                 └──────┘        │
│                                                                         │
└─────────────────────────────────────────────────────────────────────────┘
```

FIG. 6

DOCUMENT INITIATED INTELLIGENT WORKFLOW

TECHNICAL FIELD

This document generally relates to machine learning. More specifically, this document relates to machine learning techniques for document initiated intelligent workflow.

BACKGROUND

Digitally controlled workflow processes allow users to initiate various workflows using their computers or smartphones. Typically, a user will select a workflow to execute and then initiate the workflow, causing actions to be performed on other devices by other users. For example, a user that recently had a new baby may wish to update their company benefits information and their health insurance information to reflect the new child. The user may then elect a company benefits information update workflow and execute it, which may then ask the user for the updated information, which it then forwards to Human Resources (HR) so that an HR employee can update the corresponding records. The workflow then prompts the HR employee to actually update the records, and once that is completed the workflow alerts the user that the records have been updated. The user may then elect a health insurance information update workflow and execute it, and a similar workflow may execute to update the health insurance information with the user's health insurance company.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a solution is provided that allows a workflow to be identified and run based on a document submitted, rather than based on a user identifying a workflow without assistance.

Typically, in order to initiate a workflow, a user identifies the correct web page or mobile application, navigate a user interface, scan menu items, etc. to get to the right location where processes can be started. The user then selects the correct process from the choices offered, and then manually enter a significant amount of data. Much of this information is actually already available on the user device, in files on a backend system on which the workflow operates, or in a physical document, such as a letter, in the user's possession. This leads to redundant effort in retyping the information and is also a source for inconsistencies that may lead to process execution delay or even failure.

This is further complicated by the fact that each service provider is different, both in where and how the processes are offered and how they are initiated. Some are object-oriented (e.g., user logs into account, goes to a document, and chooses an action on it). Some are form-oriented (e.g., user browses forms repository, downloads the desired form, fills it in and submits it). Some are free-text based (send a message to support department, either through an online form or via e-mail). Since processes and applications are all designed by different teams and even companies, homogeneity is rarely found.

In an example embodiment, a solution is provided that allows a user to submit a document. Information can be obtained from the document using optical character recognition (OCR) or other techniques. This information can then be used to identify one or more workflows that pertain to the document. The one or more workflows may be ranked using machine learning techniques and presented to the user. Once the user selects a desired workflow, the information obtained from the document can then be used to automatically complete at least a portion of the workflow, for example by prefilling one or more fields in a form.

Notably, the user need not identify the application that corresponds to the document, or even identify a company whose workflow he or she wishes to initiate. The available workflows presented to the user can thus pertain to multiple applications and multiple companies Additionally, once the correct application and process is found, it can still be cumbersome to collect the required input data to configure the process. Typically, the data is manually read from documents (e.g., name, contract number, reference identification, line item at issue, etc.) and redundantly re-entered manually.

A deep neural network may be utilized to determine matches between candidate pairs of entities, as well as confidence scores that reflect how certain the deep neural network is about the corresponding match. The deep neural network is also able to find these matches without requiring domain knowledge that would be required if features for a machine-learned model were handcrafted, which is a drawback of prior art machine-learned models used to match entities in multiple tables. Indeed, in some instances it may be impossible for a user to define a universal set of engineered features (such as where the semantics and exact usage of terminology may vary across countries and across organizations), making prior art techniques unusable. Thus, the deep neural network improves on the functioning of prior art machine learned models designed to perform the same tasks. Specifically, the deep neural network learns the relationships of tabular fields and the patterns that define a match from historical data alone, making this approach generic and applicable independent of the context.

The technical problems to overcome in order to make this solution work can be summarized as follows. First, a workflow to trigger is automatically identified from the submitted document. Second, the context is identified, and data is prefilled into the workflow (from the document or from other sources).

Figure 1:
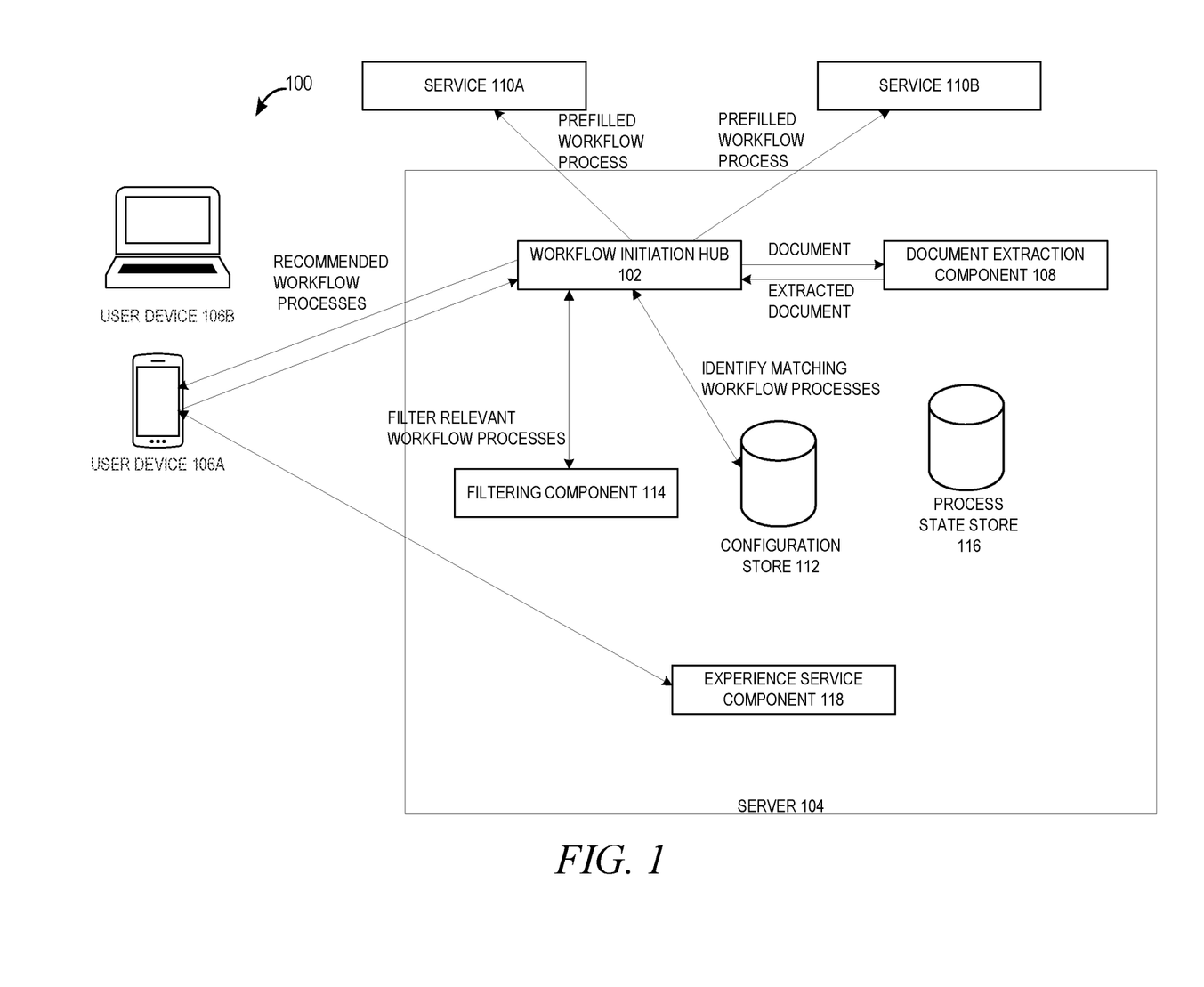
FIG. 1 is a block diagram illustrating a system for automatically selecting and executing a workflow in accordance with an example embodiment.

FIG. 1 is a block diagram illustrating a system 100 for automatically selecting and executing a workflow in accordance with an example embodiment. A workflow initiation hub 102 may be a software program or component operating on a server 104. One or more user devices 106A, 106B may interact with the workflow initiation hub 102 in order to automatically select and execute a workflow. The one or more user devices 106A, 106B may be, for example, mobile devices, laptop computers, desktop computers, etc. In the case of mobile devices, a specialized application (or "app") may be run on the mobile device to interact with the workflow initiation hub 102. Some laptop computers and desktop computers also support such apps. Alternatively, a general web browser application may be used to navigate to a specialized web page to interact with the workflow initiation hub 102.

A user of one of the user devices 106A, 106B may begin the process by submitting a document, via the user device 106A, 106B, to the workflow initiation hub 102. In one example embodiment this may be performed by using a camera on or associated with the user device 106A, 106B to capture a digital image of the document. In another example embodiment, the user may select an already-captured image or other file format document from a local data store or from a remote data store (such as by identifying a document located in a database). Regardless of how the document is captured, it is transmitted from the user device 106A, 106B to the workflow initiation hub 102.

The workflow initiation hub 102 then analyzes the document to extract data from the document. This may include utilizing a separate intelligent document extraction component 108, which may include, for example, an OCR component to perform optical character recognition to extract the data. It should be noted that there is an alternative embodiment where the bulk or even all of this analysis is performed on the user device 106A, 106B prior to the document being sent to the workflow initiation hub 102. Indeed, in some cases the document itself does not have to be transmitted to the workflow initiation hub 102, and rather the extracted data itself is sent. Nevertheless, at some point the workflow initiation hub 102 has data extracted from the document.

This data is then matched to one or more processes. Each of these processes is a workflow, meaning a process within a workflow application that automates a process that involves one or more services 110A, 110B. The matching may be performed by comparing the data to one or more mappings stored in a configuration store 112. These mappings indicate certain pieces of information that can be found in a document and corresponding processes. These pieces of information may include, for example, the type of the document, certain identifiers that can be contained in the document, and parameters read from the document. For example, if the type of the document is determined to be a birth certificate, either through OCR data extraction or through the use of a QR code identifier on the document itself, or inferred based on parameters contained in the document (e.g., the document contains a full legal name, the word "birth", a date, and a hospital name), then the mapping may indicate one or more processes that may be performed using information from the birth certificate.

The configuration store 112 may also contain information about the service or services running each of the processes identified in the mappings. Thus, for example, if one of the possible processes mapped to a birth certificate is "update insurance company information for new child to be added to policy", the configuration store 112 may contain an indication of which insurance company, servers are accessible to perform that process. This indication may be, for example, a logo of the insurance company or the name of the insurance company in a letterhead. At this stage, this information may be non-personalized, meaning that, for example, the configuration store 112 may contain information about all the possible insurance company servers that are accessible to it to perform the corresponding process, regardless of whether the user actually has an account with the corresponding insurance companies. In some example embodiments, however, the workflow initiation hub 102 may, at runtime, query each of these insurance company servers with information it knows about the user (such as name, social security number, etc.) to determine whether the user actually has an account with the insurance company, so that later when the options of potential workflows and services are presented to the user it can limit these options to only services that the user has an account with.

The configuration store 112 also may contain one or more document templates. A document template is a document that has designated fields in which to input specific types of information. In this case, each different type of document may have its own document template, which identifies what information can be obtained from a document of that corresponding type. The document templates can be used to aid in the data extraction process to extract data from the submitted documents. Specifically, not only is data extracted using OCR in some example embodiments, it also may be extracted into specific fields of a template, and those fields have different meanings. For example, characters in a "name" field mean something different than characters in a "residence" field. This document template not only helps the OCR process in extracting the right data and labeling it with its appropriate meaning, but also helps aid in identification of a document type. For example, a document whose data lines up exactly with a document template for an insurance change of address form can be easily identified as such a form, while this would be more difficult if the document only matched 80% of the fields. The document template may also specify where to extract an identifier from the document that will be used to access a backend system to obtain more information about the user and/or document. This may include, for example, a QR code identification.

The configuration store 112 may also contain, for each process, a list of data needs for the process. The data needs describe what type of data is needed in order to process a workflow, and will be used later to obtain data that can be used to prefill the selected workflow.

The workflow initiation hub 102 may then send a list of possible process options to the corresponding user device 106A, 106B, along with their corresponding lists of data needs. As mentioned above, the workflow initiation hub 102 may either send all possible process options based on the mappings, or may filter these process options based on whether the corresponding process options are useful for this user. In the latter case, a filtering component 114 may perform this filtering. In one example embodiment, as explained briefly above, the filtering component 114 may simply filter out processes for services that the user does not have an account with. This would be an example of a rules-based filtering operation. Another example would be if the process in question was temporarily unavailable, such as because the user is within a minimum contract duration. For example, the process may be to cancel the user's account, but the user may be contractually ineligible to cancel the account until a certain time period has elapsed. Other rules-based filtering operations could be performed based on one or more predetermined rules as to how to filter the process and service options. It should be noted that the filtering may also be "soft filtering", such as rather than eliminating the process completely it is simply ranked lower than other processes.

In another example embodiment, the filtering component 114 may utilize machine learning techniques to learn which process options to send to the user device 106A, 106B. The options sent may be personalized, for example, based on historical usage patterns of the user in comparison to other users. In some example embodiments, characteristics of the user may be compared to other users to locate users who have similar characteristics (such as similar demographics or locations), and usage data of users with similar characteristics to a particular user can be used in determining which options to send to the user.

Figure 2:
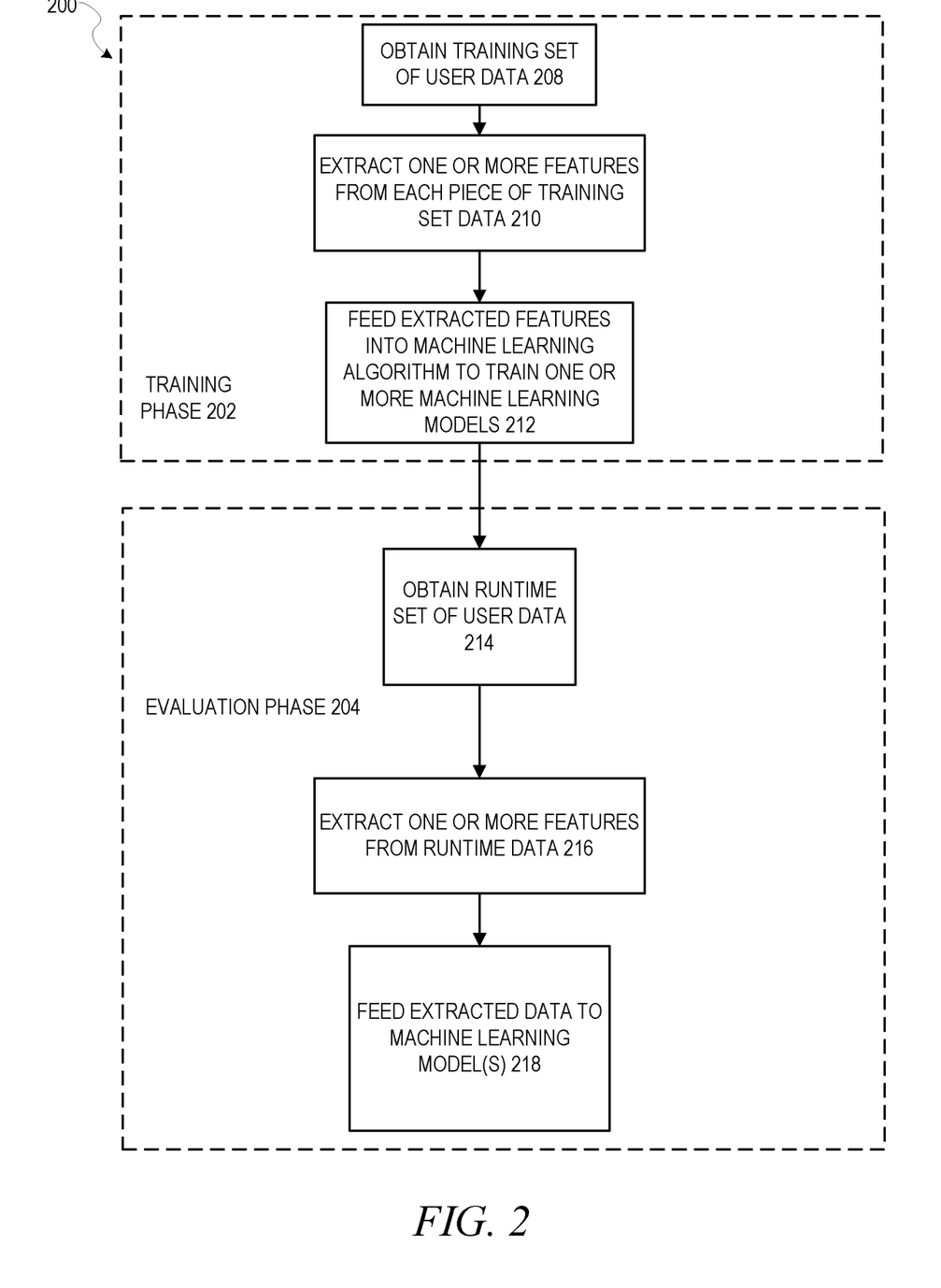
FIG. 2 is a flow diagram illustrating a method of utilizing one or more machine learning models to filter process options, in accordance with an example embodiment.

FIG. 2 is a flow diagram illustrating a method 200 of utilizing one or more machine learning models to filter process options, in accordance with an example embodiment. The method 200 may be broken up into two phases: a training phase 202 and an evaluation phase 204. Generally, the training phase 202 involves training one or more machine learning models to generate recommendations process options to send to the user device 106A, 106B. Once the training phase 202 is complete, the method 200 may progress to an evaluation phase 204, where user data and process options are fed to the trained machine learning model(s) to filter the process options.

Beginning with the training phase 202, at operation 208 a training set of user data is obtained from a database. The training set of user data may be, for example, information about the user him or herself, such as information obtained from a user profile, as well as usage information. The usage information may indicate a past history of which processes have been selected by a corresponding user and in which circumstances. At operation 210, one or more features may be extracted from each piece of the training set. The mechanism involved in the feature extraction may depend on the underlying feature. In some cases, this extraction merely involves obtaining the information directly from the training data, while in other cases the information from the training data may need to be modified or used in one or more calculations to generate the one or more features.

At operation 212, the one or more features are fed to a machine learning algorithm to train one or more machine learning models to filter process options. The machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

In the evaluation phase 204, at operation 214 a runtime set of user data is obtained, either directedly from the user device 106A 106B, or from another data source, along with a plurality of different possible options to send to the user device 106A, 106B (as obtained, for example, from the mappings in the configuration store 112).

At operation 216, one or more features are extracted from the runtime set of user data. This extraction may occur much in the same way as the extraction in operation 210.

At operation 218, the one or more features extracted from the runtime set of user data and the plurality of different possible options are fed to the one or more machine learned models. The one or more machine learned models then output a filtered set of process options, which can be used to send to the user device 106A, 106B. It should be noted that in some example embodiments, the one or more machine learned models are trained to output not just the filtered process options but also a score assigned to each process option that it outputs. This score is indicative of the relevance of the corresponding process option to the user. In certain example embodiments, these scores may be sent to the user device 106A, 106B to be used to rank the corresponding process options when displayed. In that way, for example, the process option that the one or more machine learned models thought was the most relevant to the user can be displayed at the top of the list.

Referring back to FIG. 1, once the corresponding user device 106A, 106E receives the process options (whether filtered or not), it may display one or more of them to the user for selection. Thus, for example, the user may be presented with a list of possible process options to execute based on the document that the user submitted. The user then selects one or more of those process options. As described earlier, the list of data needs for each of the process options may also have been sent to the user device 106A, 106B (although in some example embodiments only the document templates for actually selected process options are sent, following user selections). For the selected one or more process options, the list of data needs may then be used to prefill information about the user and/or document into the process. Specifically, certain information is contained in the document itself and/or known about the user by the user device 106A, 106B. It is common, for example, for mobile device users to have stored their name, phone number, birth date, address, etc. for use with other applications on the mobile device. For example, in order to easily have a mapping application navigate the user to their home, many users store their home address on the mobile device in a contact record for themselves. That contact record may contain other information about the user, such as phone number and full name, that may be used by other applications, such as phone or text applications. While it is common for mobile device manufacturers to create protections in their operating system software that prevent one application from using the personal user information collected by another application unless explicitly permitted by the user, in many cases the mobile device manufacturers have also made it easy for the user to allow such information sharing at runtime, through the use of various pop-up windows asking for permission for application A to utilize the personal information. Assuming the user permits such access, this information can be used to prefill the information into the selected process. As such, both information from the document that the user submitted and information known to the user device 106A, 106B can be utilized to aid in prefilling the selected process.

In some example embodiments, other data sources may also be utilized to obtain information to prefill the selected process (assuming the user has granted permission for such information sharing). For example, an HR department of a company will often maintain an electronic record of user information. This information can then also be accessed to prefill the selected process.

It should be noted that there may be legal restrictions on which type of information can be shared in this way, and how the data can actually be used. In the United States, for example, Health Insurance Portability and Accountability Act (HIPAA) requirements limit how health-related information can be shared and to whom. One advantage of the present solution is that it is possible for the prefilling of the selected process to be performed by the user's own device, thus enabling the user's device to obtain confidential information about the user that a more centralized component, such as the workflow initiation hub 102, may not be able to obtain directly.

The indication of which process option was selected by the user along with the prefilled data may then be sent to the workflow initiation hub 102. The workflow initiation hub 102 may then trigger the corresponding service 110A, 110B to begin the selected process and pass the prefilled data to that service. Since the service 110A, 110B may need to obtain additional information from the user that was not prefilled into the process and/or may need additional approvals or communications from the user, the workflow initiation hub 102 may also trigger the corresponding user device 106A, 106B to launch a corresponding application to provide that additional information or approval.

It should also be noted that the workflow initiation hub 102 may maintain a process state store 116, which stores the statuses of executed processes. It is possible, for example, for a user to initiate a process but then not complete it until a later date or time. Additionally, in some cases a user may complete their portion of a process but then at a later time send the same document again to the workflow initiation hub 102 to try and see the status of the workflow. In this case, the workflow initiation hub may, after detecting that the earlier workflow is still in progress, offer an option to "get update" from the service 110A, 110B.

An experience service component 118 may then also query the user device 106A, 106B to obtain feedback about the selected process. This may be in the form of a user experience questionnaire, where the user can rate the process launch and the process options and other parameters of interest to the service provider. Because the executed process instance is known, the captured experience data can be related to operations data of the process by the service for this workflow. The results may also be fed into the machine learning process to further improve the results. For example, if the user was happy with the offered options, then this reinforces the ranking performed by the filtering component.

Figure 3A:
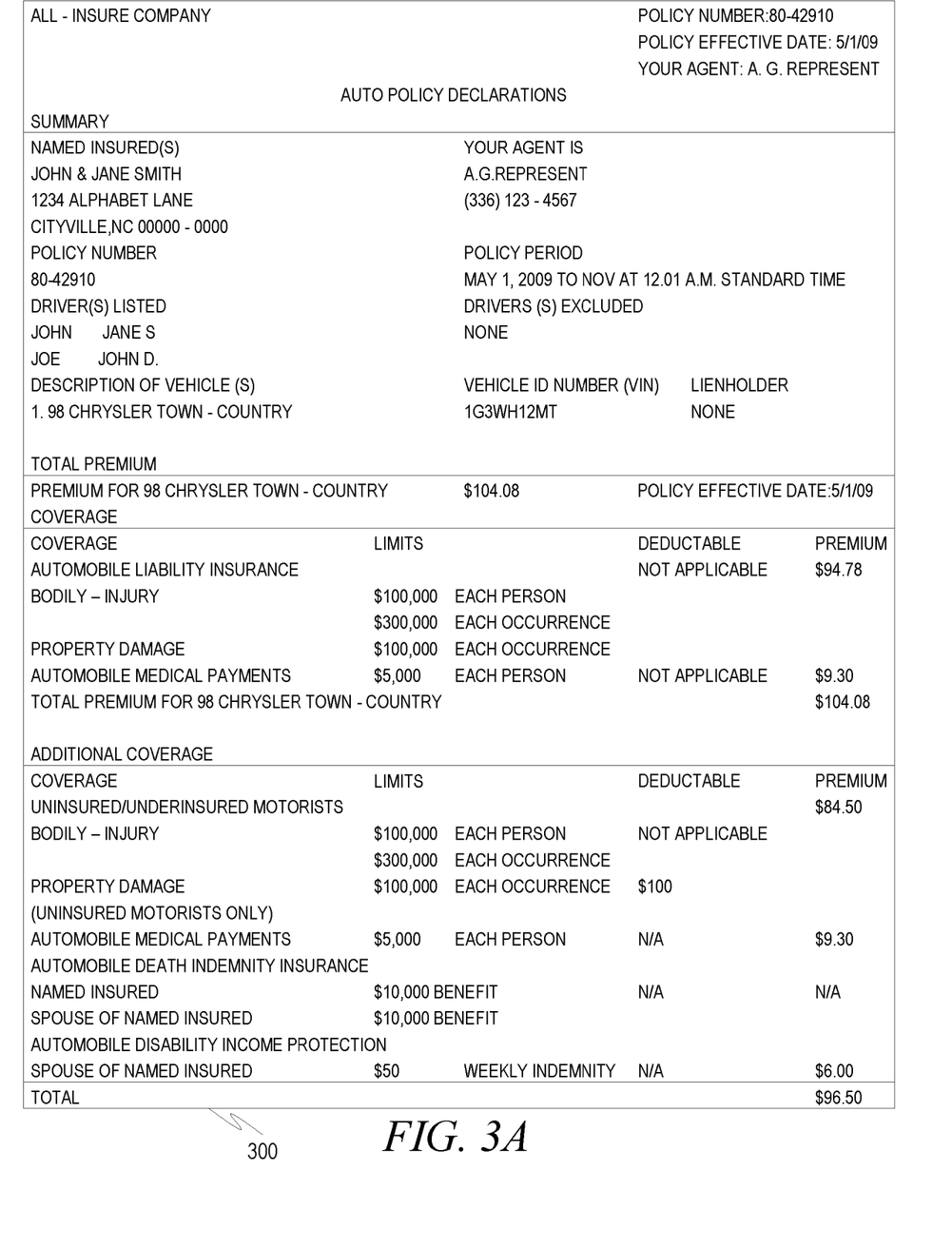
FIG. 3A is a diagram illustrating an example document in accordance with an example embodiment.
Figure 3B:
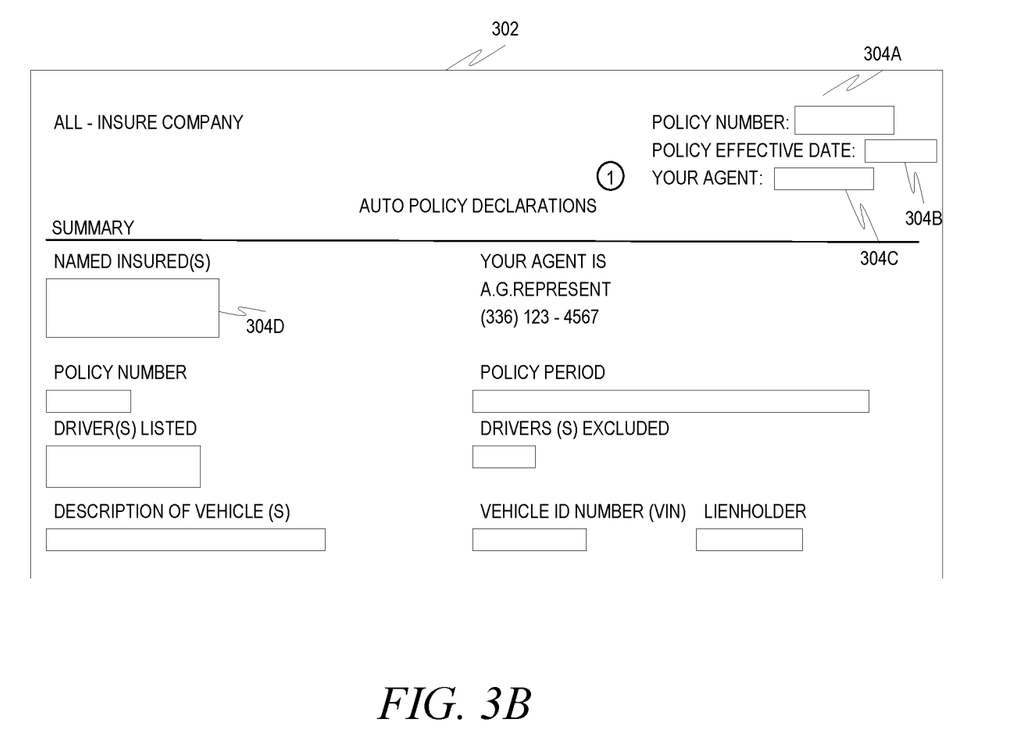
FIG. 3B is a diagram illustrating an example document template in accordance with an example embodiment.

FIG. 3A is a diagram illustrating an example document 300 in accordance with an example embodiment. FIG. 3B is a diagram illustrating an example document template 302 in accordance with an example embodiment. Here, the document is an automobile insurance policy declarations page. The user may be submitting an image of the page as the document 300 in the hopes of initiating a workflow to update their address. The document template 302 contains identified fields, such as fields 304A, 304B, 304C, and 304D. OCR may be performed on the document 300, using the document template 302, to identify text to be placed in the respective fields 304A, 304B, 304C, 304D. Some of this text may be used to identify the user's account, such as policy number 304A, which can be used to retrieve additional information about the user's account that may not be present in the completed document 300. This additional information can also be used to supplement or even replace the OCR process in specific areas of the document. For example, if the OCR process can at least identify the policy number and the type of the form in the document 300, then it may be able to retrieve all the other information it needs from an insurance company server using the policy number, and may use this information either instead of performing OCR on the rest of the document 300, or to aid in the OCR process (such as to resolve ambiguities in what the OCR process thinks text contains).

This backend-server embodiment can also be used to retrieve information that can be used later in the process, when prefilling the list of data needs. Additionally, in some example embodiments, the document 300 may contain an instance of an individual QR code to reference content stored at a connected service, possibly eliminating the need to perform OCR at all.

There are three sources of information: the document 300 itself, the user device (e.g., smartphone or browser on a computer), and data stored in a backend system. The data stored in the backend system may include master data, operational data (O-data), and workflow status. The combination of these data sets may be used to aid in the selection of a service responsible for the document type, the workflows offered by this service for this document (so the user can select the desired workflow to be initiated), and fill-in related information from the document and the client into the workflow.

Generally, any organization that wishes to partner or otherwise cooperate with the workflow initiation hub 102 can provide a set of document templates A.1 . . . A.n to the workflow initiation hub 102 for each service that is connected to the workflow initiation hub 102. The templates define which areas of the document to scan and from which data is extracted, and how these are mapped to workflow parameters. An alternative entry point would be a document identifier, such as a QR code, which can be entered into the app. The app then does not extract data from the document, but queries the respective backend system to retrieve the related data from the system, instead of scanning the document. The organization may provide a Uniform Resource Locator (URL) or app-name for each service.

The organization may also provide the options O.1[1–m]–O.n[1–p] to show to the user what can be done with the respective document templates A.1 . . . A.n.

The user installs, or has already installed, the app of organization A or receives a URL to call in the browser on the client.

The user then opens the launch app and scans a document. The launch app sends the document to the workflow initiation hub 102. The workflow initiation hub 102 creates a session context for this operation and stores the document image. Then it scans the document using the defined templates.

It then reads the session-context store to identify if a session context has already been created for this document (same document type and parameters). If a session context is found for the document, the workflow initiation hub 102 links this new call to the existing context. Then it checks with the service for available options for the already-running process. The service can then add further options that relate to a running process, such as cancel process, edit process, or check status, and then sends these options to the launch app. Thus, the organization running the service may provide a series of options for each document type. One set of options relate to options to start a workflow, such as change my address, report contract-relevant event, or cancel contract.

Another set of options relate to options for running workflows, and may be workflow specific. For example, if the workflow is a change of address workflow, the already-running options may include reverting an address change, editing or amending an address change, or finding out the status of the address change.

If no session context for this session is already found in the session-context store, then an initial process recommendation can take place, as described earlier. Specifically, the workflow initiation hub 102 may utilize a mapping between document templates to document types (there can be multiple templates for one type), a mapping between document types and services, and a mapping between document type and available options to identify the most relevant process options to present to the user for selection. It can also utilize the list of data needs, which may be rules indicating how to pre-fill a workflow, depending on document type, and read parameters and retrieve information to prefill the workflow. For example, if a birth certificate is the document, then a "special leave" workflow may be prefilled with "birth of a child" whereas the same workflow may be prefilled with "death of a relative" if a death certificate is submitted.

Figure 4:
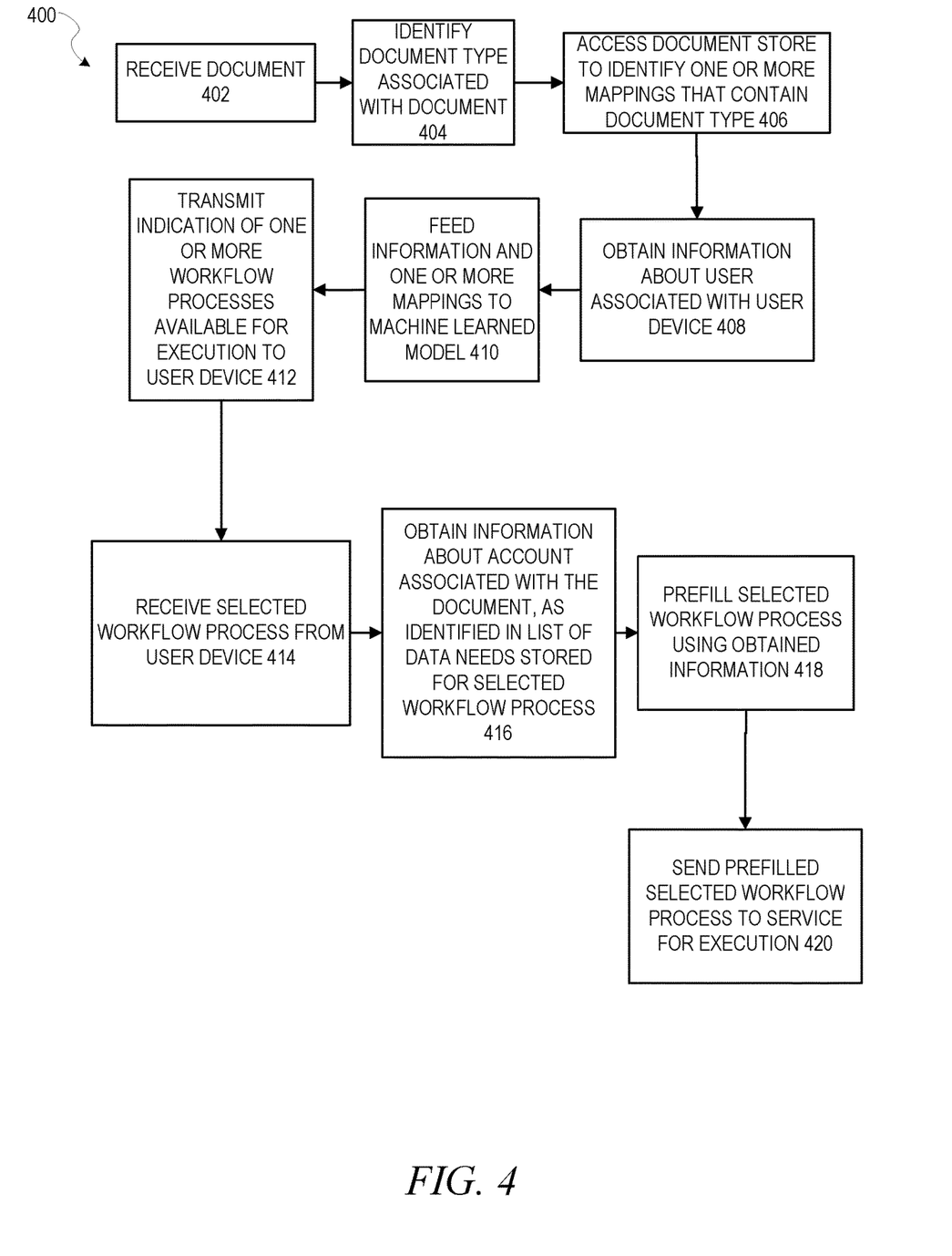
FIG. 4 is a flow diagram illustrating a method of automatically, handling a workflow process from a plurality of potential workflow processes in accordance with an example embodiment.

FIG. 4 is a flow diagram illustrating a method 400 of automatically handling a workflow process from a plurality of potential workflow processes in accordance with an example embodiment. In an example embodiment, the method 400 is performed at a workflow initiation hub running on a computer server.

At operation 402, a document is received from a user device over a communications network. At operation 404 the document type associated with the document is identified.

At operation 406, a configuration store is accessed to identify one or more mappings that contain the document type. Each of these mappings may specify one or more workflow processes available for execution at a service separate and distinct from the workflow initiation hub. At operation 408, information is obtained about a user associated with the user device. At operation 410, the information obtained about the user and the one or more mappings that contain the document type are fed into a machine learned model, which outputs an indication (such as a numerical score) of a predicted relevance of each of the one or more mappings that contain the document type to the user. The indication may be used to filter which of the workflow processes associated with the matching mappings to send to the user device (such as by comparing the numerical score to a minimum threshold).

At operation 412, an indication of one or more of the one or more workflow processes available for execution are transmitted to the user device. Optionally, the indications of relevance may also be sent, which would allow, for example, the user device to rank the workflow processes when presenting them to the user for selection.

At operation 414, a selected workflow process is received from the user device. At operation 416, information, about an account associated with the document, that is identified in a list of data needs stored for the selected workflow process, is obtained. This may be performed by, for example, retrieving the list of data needs for the selected workflow process, identifying the type of data needed to fulfil those needs, and querying the corresponding service using an account identification (obtained from, for example, the document) to obtain the needed information. Alternatively, the information may be obtained from the document itself.

At operation 418, the selected workflow process is prefilled using the obtained information. At operation 420, the prefilled selected workflow process is sent to the service associated with the selected workflow process for execution.

Figure 5:
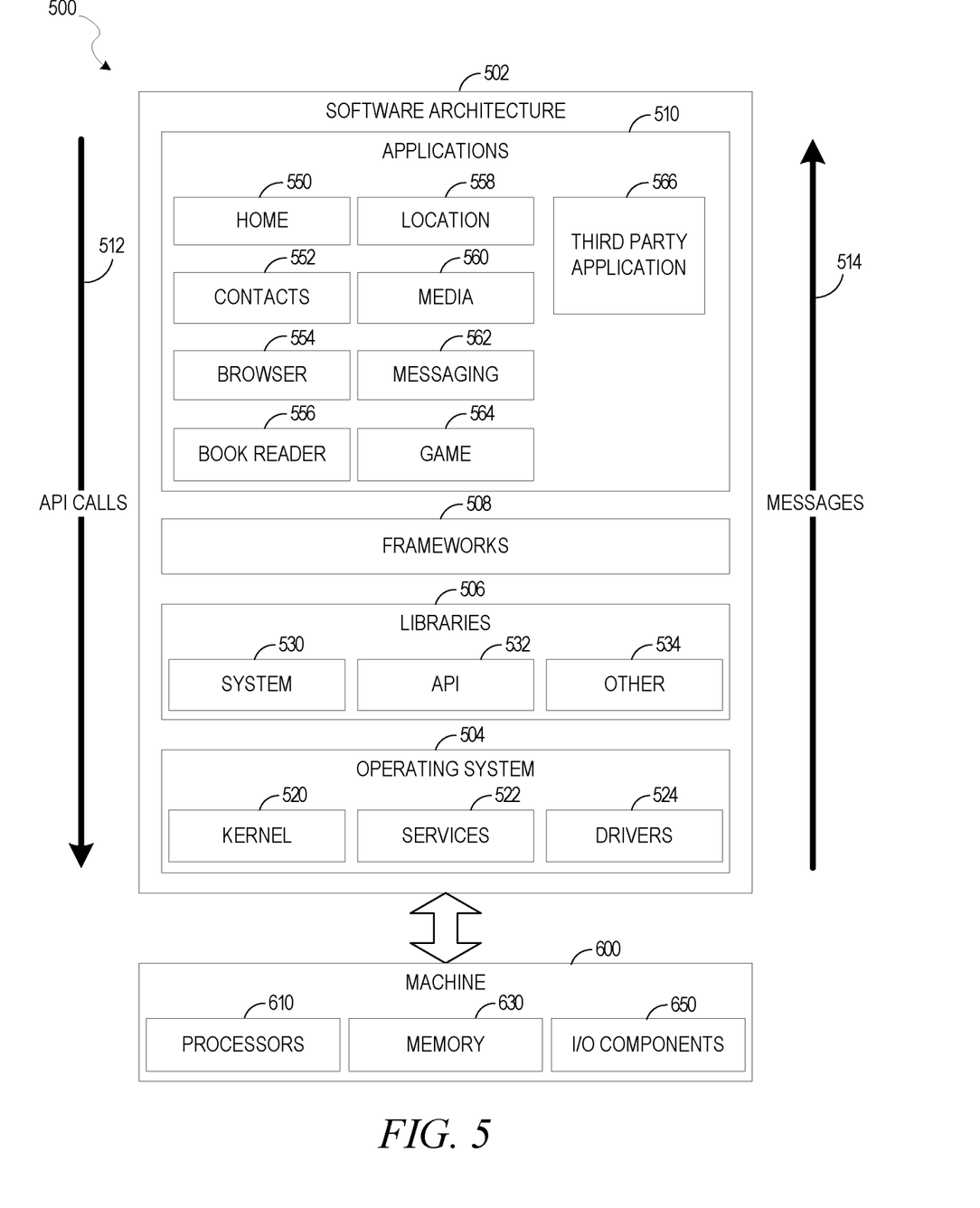
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory, allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
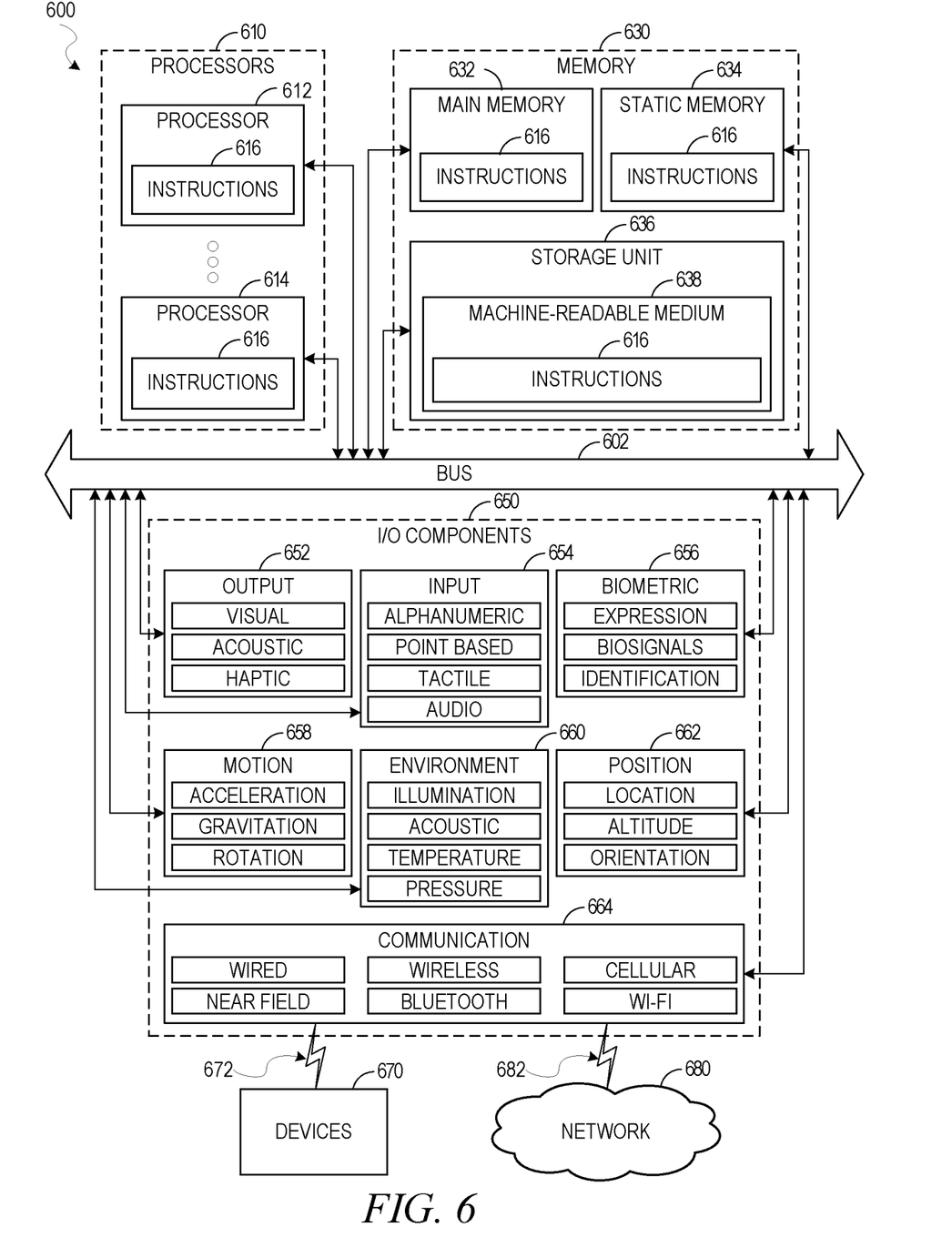
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit ((SPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components); point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example; the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g.; photometer), temperature sensor components (e.g., one or more thermometers that detect ambient temperature), humidity sensor components, pressure sensor components (e.g., barometer), acoustic sensor components one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (INK) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFT beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM, field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Examples

Example 1. A System Comprising
at least one hardware processor; and
a non-transitory computer-readable medium storing instructions that, when executed by the at least one hardware processor, cause the at least one hardware processor to perform operations comprising:
receiving a document from a user device, at a workflow initiation hub, and over a communications network;
identifying a document type associated with the document;
accessing a configuration store to identify one or more mappings that contain the document type, the one or more mappings each specifying one or more workflow processes available for execution at a service operating on hardware separate and distinct from the workflow initiation hub;
transmitting, over the communications network, an indication of one or more of the one or more workflow processes available for execution to the user device;
receiving, from the user device over the communications network, a selected workflow process from the one or more workflow processes available for execution;
obtaining information, about an account associated with the document, identified in a list of data needs stored for the selected workflow process;
prefilling the selected workflow process using the obtained information; and
sending the prefilled selected workflow process to the service associated with the selected workflow process for execution.

Example 2. The system of Example 1, wherein the accessing the configuration store includes:
identifying a plurality of mappings containing the document type;
obtaining information about a user associated with the user device;
feeding the plurality of mappings and the information about the user associated with the user device to a machine learned model trained to output an indication of relevance of each of the plurality of mappings to the user associated with the user device.

Example 3. The system of Example 2, wherein the indication of relevance is a numerical score.

Example 4. The system of Examples 2 or 3; wherein the operations further comprise:
obtaining training data, the training data comprising an identification of one or more workflow processes and usage information, the usage information identifying users who have initiated the one or more workflow processes in the training data;
feeding the training data to a machine learning algorithm to train the machine learned model, wherein an indication that a user has initiated a workflow process is a positive label used during the training and features are extracted from the identification of the one or more workflow processes and user information.

Example 5. The system of Examples 3 or 4, wherein the transmitting further includes sending the numerical score for each of the one or more workflow processes available for execution that are being transmitted to the user device.

Example 6. The system of any of Examples 1-5, wherein the operations further include performing optical character recognition on the document, using a document template, for the document, stored in the configuration store.

Example 7. The system of any of Examples 1-6, wherein the obtaining information, about an account associated with the document, identified in a list of data needs stored for the selected workflow process includes accessing data about a user associated with the user device from the user device.

Example 8. A method comprising:
receiving a document from a user device, at a workflow initiation hub, and over a communications network;
identifying a document type associated with the document;
accessing a configuration store to identify one or more mappings that contain the document type, the one or more mappings each specifying one or more workflow processes available for execution at a service operating on hardware separate and distinct from the workflow initiation hub;
transmitting, over the communications network, an indication of one or more of the one or more workflow processes available for execution to the user device;
receiving, from the user device over the communications network, a selected workflow process from the one or more workflow processes available for execution;
obtaining information, about an account associated with the document, identified in a list of data needs stored for the selected workflow process;
prefilling the selected workflow process using the obtained information; and
sending the prefilled selected workflow process to the service associated with the selected workflow process for execution.

Example 9. The method of Example 8, wherein the accessing the configuration store includes:
identifying a plurality of mappings containing the document type;
obtaining information about a user associated with the user device;
feeding the plurality of mappings and the information about the user associated with the user device to a machine learned model trained to output an indication of relevance of each of the plurality of mappings to the user associated with the user device.

Example 10. The method of Example 9, wherein the indication of relevance is a numerical score.

Example 11. The method of Examples 9 or 10, wherein the operations further comprise:
  obtaining training data, the training data comprising an identification of one or more workflow processes and usage information, the usage information identifying users who have initiated the one or more workflow processes in the training data;
  feeding the training data to a machine learning algorithm to train the machine learned model, wherein an indication that a user has initiated a workflow process is a positive label used during the training and features are extracted from the identification of the one or more workflow processes and user information.

Example 12. The method of Examples 10-11, wherein the transmitting further includes sending the numerical score for each of the one or more workflow processes available for execution that are being transmitted to the user device.

Example 13. The method of any of Examples 8-12, further comprising performing optical character recognition on the document, using a document template, for the document, stored in the configuration store.

Example 14. The method of any of Examples 8-13, wherein the obtaining information, about an account associated with the document, identified in a list of data needs stored for the selected workflow process includes accessing data about a user associated with the user device from the user device.

Example 15. A non-transitory machine-readable medium storing instructions which, when executed by one or more processors, cause the one or more processors to perform operations comprising:
  receiving a document from a user device, at a workflow initiation hub, and over a communications network;
  identifying a document type associated with the document;
  accessing a configuration store to identify one or more mappings that contain the document type, the one or more mappings each specifying one or more workflow processes available for execution at a service operating on hardware separate and distinct from the workflow initiation hub;
  transmitting, over the communications network, an indication of one or more of the one or more workflow processes available for execution to the user device;
  receiving, from the user device over the communications network, a selected workflow process from the one or more workflow processes available for execution;
  obtaining information, about an account associated with the document, identified in a list of data needs stored for the selected workflow process;
  prefilling the selected workflow process using the obtained information; and
  sending the prefilled selected workflow process to the service associated with the selected workflow process for execution.

Example 16. The non-transitory machine-readable medium of Example 15, wherein the accessing the configuration store includes:
  identifying a plurality of mappings containing the document type;
  obtaining information about a user associated with the user device;
  feeding the plurality of mappings and the information about the user associated with the user device to a machine learned model trained to output an indication of relevance of each of the plurality of mappings to the user associated with the user device.

Example 17. The non-transitory machine-readable medium of Example 16, wherein the indication of relevance is a numerical score.

Example 18. The non-transitory machine-readable medium of Examples 16 or 17, wherein the operations further comprise:
  obtaining training data, the training data comprising an identification of one or more workflow processes and usage information, the usage information identifying users who have initiated the one or more workflow processes in the training data;
  feeding the training data to a machine learning algorithm to train the machine learned model, wherein an indication that a user has initiated a workflow process is a positive label used during the training and features are extracted from the identification of the one or more workflow processes and user information.

Example 19. The non-transitory machine-readable medium of Examples 17 or 18, wherein the transmitting further includes sending the numerical score for each of the one or more workflow processes available for execution that are being transmitted to the user device.

Example 20. The non-transitory machine-readable medium of any of Examples 15-19, wherein the operations further comprise performing optical character recognition on the document, using a document template, for the document, stored in the configuration store.

What is claimed is:

1. A system comprising:
  at least one hardware processor; and
  a non-transitory computer-readable medium storing instructions that, when executed by the at least one hardware processor, cause the at least one hardware processor to perform operations comprising:
  receiving a document from a user device, at a workflow initiation hub, and over a communications network;
  identifying a document type associated with the document;
  accessing a configuration store to identify one or more mappings that contain the document type, the one or more mappings each specifying one or more workflow processes available for execution at a service operating on hardware separate and distinct from the workflow initiation hub;
  transmitting, over the communications network, an indication of one or more of the one or more workflow processes available for execution to the user device;
  receiving, from the user device over the communications network, a selected workflow process from the one or more workflow processes available for execution;
  obtaining information, about an account associated with the document, identified in a list of data needs stored for the selected workflow process;
  prefilling the selected workflow process using the obtained information; and sending the prefilled selected workflow process to the service associated with the selected workflow process for execution.

2. The system of claim 1, wherein the accessing the configuration store includes:
   identifying a plurality of mappings containing the document type;
   obtaining information about a user associated with the user device; and
   feeding the plurality of mappings and the information about the user associated with the user device to a machine learned model trained to output an indication of relevance of each of the plurality of mappings to the user associated with the user device.

3. The system of claim 2, wherein the indication of relevance is a numerical score.

4. The system of claim 2, wherein the operations further comprise:
   obtaining training data, the training data comprising an identification of one or more workflow processes and usage information, the usage information identifying users who have initiated the one or more workflow processes in the training data; and
   feeding the training data to a machine learning algorithm to train the machine learned model, wherein an indication that a user has initiated a workflow process is a positive label used during the training and features are extracted from the identification of the one or more workflow processes and user information.

5. The system of claim 3, wherein the transmitting further includes sending the numerical score for each of the one or more workflow processes available for execution that are being transmitted to the user device.

6. The system of claim 1, wherein the operations further comprise performing optical character recognition on the document, using a document template, for the document, stored in the configuration store.

7. The system of claim 1, wherein the obtaining information, about an account associated with the document, identified in a list of data needs stored for the selected workflow process includes accessing data about a user associated with the user device from the user device.

8. A method comprising:
   receiving a document from a user device, at a workflow initiation hub, and over a communications network;
   identifying a document type associated with the document;
   accessing a configuration store to identify one or more mappings that contain the document type, the one or more mappings each specifying one or more workflow processes available for execution at a service operating on hardware separate and distinct from the workflow initiation hub;
   transmitting, over the communications network, an indication of one or more of the one or more workflow processes available for execution to the user device;
   receiving, from the user device over the communications network, a selected workflow process from the one or more workflow processes available for execution;
   obtaining information, about an account associated with the document, identified in a list of data needs stored for the selected workflow process;
   prefilling the selected workflow process using the obtained information; and
   sending the prefilled selected workflow process to the service associated with the selected workflow process for execution.

9. The method of claim 8, wherein the accessing the configuration store includes:
   identifying a plurality of mappings containing the document type;
   obtaining information about a user associated with the user device; and
   feeding the plurality of mappings and the information about the user associated with the user device to a machine learned model trained to output an indication of relevance of each of the plurality of mappings to the user associated with the user device.

10. The method of claim 9, wherein the indication of relevance is a numerical score.

11. The method of claim 9, wherein the operations further comprise:
    obtaining training data, the training data comprising an identification of one or more workflow processes and usage information, the usage information identifying users who have initiated the one or more workflow processes in the training data; and
    feeding the training data to a machine learning algorithm to train the machine learned model, wherein an indication that a user has initiated a workflow process is a positive label used during the training and features are extracted from the identification of the one or more workflow processes and user information.

12. The method of claim 10, wherein the transmitting further includes sending the numerical score for each of the one or more workflow processes available for execution that are being transmitted to the user device.

13. The method of claim 8, further comprising performing optical character recognition on the document, using a document template, for the document, stored in the configuration store.

14. The method of claim 8, wherein the obtaining information, about an account associated with the document, identified in a list of data needs stored for the selected workflow process includes accessing data about a user associated with the user device from the user device.

15. A non-transitory machine-readable medium storing instructions which, when executed by one or more processors, cause the one or more processors to perform operations comprising:
    receiving a document from a user device, at a workflow initiation hub, and over a communications network;
    identifying a document type associated with the document;
    accessing a configuration store to identify one or more mappings that contain the document type, the one or more mappings each specifying one or more workflow processes available for execution at a service operating on hardware separate and distinct from the workflow initiation hub;
    transmitting, over the communications network, an indication of one or more of the one or more workflow processes available for execution to the user device;
    receiving, from the user device over the communications network, a selected workflow process from the one or more workflow processes available for execution;
    obtaining information, about an account associated with the document, identified in a list of data needs stored for the selected workflow process;
    prefilling the selected workflow process using the obtained information; and
    sending the prefilled selected workflow process to the service associated with the selected workflow process for execution.

16. The non-transitory machine-readable medium of claim 15, wherein the accessing the configuration store includes:
  identifying a plurality of mappings containing the document type;
  obtaining information about a user associated with the user device; and
  feeding the plurality of mappings and the information about the user associated with the user device to a machine learned model trained to output an indication of relevance of each of the plurality of mappings to the user associated with the user device.

17. The non-transitory machine-readable medium of claim 16, wherein the indication of relevance is a numerical score.

18. The non-transitory machine-readable medium of claim 15, wherein the operations further comprise:
  obtaining training data, the training data comprising an identification of one or more workflow processes and usage information, the usage information identifying users who have initiated the one or more workflow processes in the training data; and
  feeding the training data to a machine learning algorithm to train a machine learned model, wherein an indication that a user has initiated a workflow process is a positive label used during the training and features are extracted from the identification of the one or more workflow processes and user information.

19. The non-transitory machine-readable medium of claim 17, wherein the transmitting further includes sending the numerical score for each of the one or more workflow processes available for execution that are being transmitted to the user device.

20. The non-transitory machine-readable medium of claim 15, wherein the operations further comprise performing optical character recognition on the document, using a document template, for the document, stored in the configuration store.

* * * * *